United States Patent …

(12) United States Patent
Xu

(10) Patent No.: US 12,271,225 B2
(45) Date of Patent: Apr. 8, 2025

(54) MOBILE TERMINAL PROTECTIVE SHELL

(71) Applicant: Shenzhen Yuanfei Technology Co., Ltd., Guangdong (CN)

(72) Inventor: Guowei Xu, Guangdong (CN)

(73) Assignee: Shenzhen Yuanfei Technology Co., Ltd., Shenzhen (CN)

(*) Notice: Subject to any disclaimer, the term of this patent is extended or adjusted under 35 U.S.C. 154(b) by 0 days.

(21) Appl. No.: 18/815,843

(22) Filed: Aug. 27, 2024

(65) Prior Publication Data

US 2025/0076923 A1    Mar. 6, 2025

(30) Foreign Application Priority Data

Aug. 29, 2023    (CN) .................. 202322358805.0

(51) Int. Cl.
*G06F 1/16*    (2006.01)

(52) U.S. Cl.
CPC .................. *G06F 1/1626* (2013.01)

(58) Field of Classification Search
CPC .................................................. G06F 1/1626
See application file for complete search history.

(56) References Cited

U.S. PATENT DOCUMENTS

| | | | | |
|---|---|---|---|---|
| 5,164,542 A * | 11/1992 | Hart | ...................... | G06F 1/1656 361/679.02 |
| 5,264,992 A * | 11/1993 | Hogdahl | ............... | G06F 1/1656 428/317.1 |
| 5,329,427 A * | 7/1994 | Hogdahl | ............... | G06F 1/1626 361/728 |
| 6,421,235 B2 * | 7/2002 | Ditzik | ............... | H04M 1/72409 361/679.3 |
| 6,944,012 B2 * | 9/2005 | Doczy | .................. | G06F 1/1632 345/905 |
| 6,952,340 B2 * | 10/2005 | Son | ...................... | G06F 1/3203 361/679.44 |
| 6,970,678 B1 * | 11/2005 | Ditzik | .................. | G06F 1/1616 455/11.1 |
| 7,509,142 B2 * | 3/2009 | Ditzik | .................. | G06F 1/1618 455/556.1 |
| 8,913,376 B2 * | 12/2014 | Wu | ...................... | G06F 1/1669 361/679.08 |
| 9,335,793 B2 * | 5/2016 | Rothkopf | ............ | G06F 3/04883 |
| 9,600,034 B2 * | 3/2017 | Kiple | .................... | G06F 1/1681 |

(Continued)

*Primary Examiner* — Lisa Lea-Edmonds

(57) ABSTRACT

A mobile terminal protective shell is used for installing a mobile terminal, and includes a housing body, an expansion assembly and a connecting mechanism. The connecting mechanism is connected to the housing body and the expansion assembly to make the housing body be capable of rotating relative to the expansion assembly. The housing body is used for accommodating the mobile terminal. The connecting mechanism includes a mounting assembly and a connecting assembly, the mounting assembly is fixedly installed on the expansion assembly, the connecting assembly is rotatably connected to the mounting assembly, and the connecting assembly is detachably connected to the housing body. The connecting assembly is driven to rotate relative to the mounting assembly to change an angle of the housing body relative to the expansion assembly, solving the problem that the angle between the mobile terminal and the expansion assembly cannot be adjusted, and improving the user experience.

20 Claims, 12 Drawing Sheets

(56) References Cited

U.S. PATENT DOCUMENTS

| | | | | |
|---|---|---|---|---|
| 9,841,785 B2* | 12/2017 | Tzou | ................... | G06F 1/1632 |
| 9,851,751 B2* | 12/2017 | Sugiura | ................ | G06F 1/1626 |
| 10,067,532 B2* | 9/2018 | Tzou | ................... | G06F 3/0202 |
| 10,488,883 B2* | 11/2019 | Rothkopf | .............. | G06F 1/1654 |
| 11,751,653 B2* | 9/2023 | Goonetilleke | ........ | G06F 1/1628 |
| | | | | 206/320 |
| 2001/0030850 A1* | 10/2001 | Ditzik | .................... | G06F 1/166 |
| | | | | 361/679.3 |
| 2004/0090742 A1* | 5/2004 | Son | ....................... | G06F 1/3203 |
| | | | | 361/679.44 |
| 2004/0233620 A1* | 11/2004 | Doczy | ................. | G06F 1/1671 |
| | | | | 361/679.15 |
| 2006/0079277 A1* | 4/2006 | Ditzik | .................. | G06F 1/1679 |
| | | | | 455/556.1 |
| 2012/0194448 A1* | 8/2012 | Rothkopf | ............. | G06F 1/1643 |
| | | | | 361/679.01 |
| 2012/0287562 A1* | 11/2012 | Wu | ....................... | G06F 1/1662 |
| | | | | 361/679.01 |
| 2012/0327580 A1* | 12/2012 | Gengler | ............... | G06F 1/1677 |
| | | | | 361/679.09 |
| 2015/0227212 A1* | 8/2015 | Whitt, III | ............. | G06F 1/1669 |
| | | | | 156/60 |
| 2016/0062484 A1* | 3/2016 | Sugiura | ................ | G06F 3/0202 |
| | | | | 345/156 |
| 2016/0091927 A1* | 3/2016 | Tzou | ................... | G06F 1/1681 |
| | | | | 361/679.58 |
| 2016/0224238 A1* | 8/2016 | Rothkopf | ............. | G06F 1/1652 |
| 2018/0052490 A1* | 2/2018 | Tzou | ................... | G06F 1/1626 |
| 2020/0097045 A1* | 3/2020 | Claudepierre | .... | H04M 1/72409 |

* cited by examiner

MOBILE TERMINAL PROTECTIVE SHELL

CROSS-REFERENCE TO RELATED APPLICATION

This application claims priority to Chinese patent application No. 202322358805.0, filed to China National Intellectual Property Administration (CNIPA) on Aug. 29, 2023. The entire contents of the above-mentioned application are incorporated herein by reference.

TECHNICAL FIELD

The disclosure relates to the technical field of protective shells, and more particularly to a mobile terminal protective shell.

BACKGROUND

Mobile terminal can usually be connected to an external keyboard for use. After the mobile terminal is equipped with a protective shell, it is usually electrically connected to the external keyboard through the protective shell. The existing external keyboard is generally provided with a fixed support structure, the protective shell is placed on the support structure, the protective shell placed on the support structure is electrically connected to the external keyboard through a universal serial bus (USB) interface or a pogo pin interface, and then the mobile terminal is installed on and electrically connected to the protective shell, so that the external keyboard can be used to operate the mobile terminal.

However, a connection relationship between the existing external keyboard and the protective shell is unique when in use, an angle of the protective shell and the mobile terminal can be adjusted, which is inconvenient for the use of the mobile terminal.

SUMMARY

In view of this, the disclosure provides a mobile terminal protective shell, which is used to solve the problem that an angle of the mobile terminal protective shell cannot be adjusted in the related art.

In order to achieve any or all of the above purposes or other purposes, the disclosure provides a mobile terminal protective shell used for installing a mobile terminal. The mobile terminal protective shell includes a housing body, an expansion assembly and a connecting mechanism. The connecting mechanism is connected to the housing body and the expansion assembly to make the housing body be capable of rotating relative to the expansion assembly. The housing body is configured to accommodate the mobile terminal. The connecting mechanism includes a mounting assembly and a connecting assembly, the mounting assembly is fixedly installed on the expansion assembly, the connecting assembly is rotatably connected to the mounting assembly, and the connecting assembly is detachably connected to the housing body. The connecting assembly is driven to rotate relative to the mounting assembly to change an angle of the housing body relative to the expansion assembly.

The embodiment of the disclosure has the following beneficial effects:

After the mobile terminal protective shell is adopted, the user drives the connecting assembly to rotate relative to the mounting assembly, so as to change the angle of the housing body relative to the expansion assembly, thereby solving the problem that the angle between the mobile terminal and the expansion assembly cannot be adjusted in the related art, and improving the user experience.

BRIEF DESCRIPTION OF DRAWINGS

In order to more clearly illustrate embodiments of the disclosure or the technical scheme in the related art, the drawings needed to be used in the description of the embodiments or the related art will be briefly introduced below. Apparently, the drawings in the following description are only some embodiments of the disclosure, and other drawings can be obtained according to these drawings without creative work for those skilled in the art.

Figure 1:
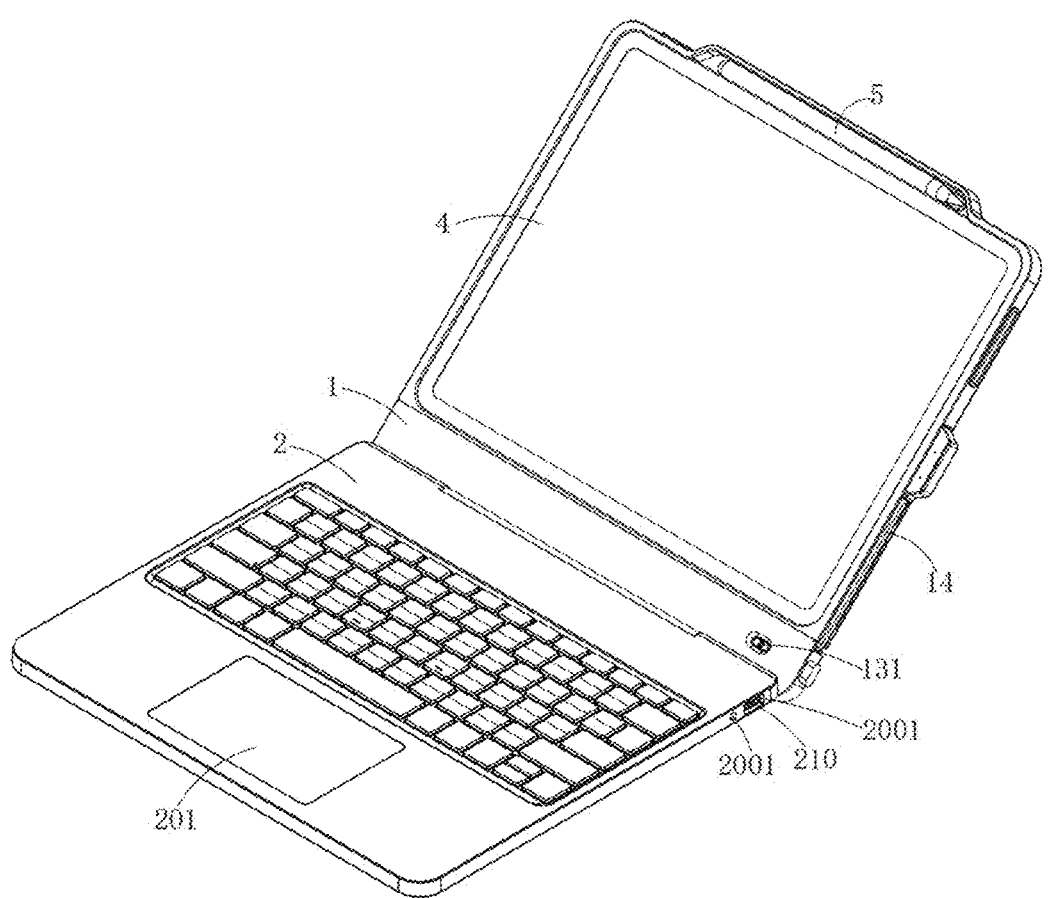
FIG. 1 illustrates a schematic diagram of a mobile terminal protective shell in a use state according to an embodiment.

DESCRIPTION OF REFERENCE SIGNS housing body 1, mounting housing 10, mounting plate 110, reinforcing groove 111, connecting groove 112, abutting part 113, accommodating cavity 114, wire through hole 115, groove 116, protective sleeve 120, placement cavity 121, pen slot 122, notch 123, wire slot 124, first electrical connector 11, first magnetic member 12, second circuit board 13, control switch 131, hard disk expansion interface 132, high definition multimedia interface (HDMI) 133, Type-C interface 134, second wire 14, cover plate 15, heat dissipation plate 16, second insertion holes 1101, expansion assembly 2, expansion body 20, touchpad 201, first circuit board 21, universal serial bus (USB) interface 210, audio interface 211, secure digital (SD) card reading interface 212, TransFlash (TF) card reading interface 213, touch interface 214, first insertion holes 2001, connecting mechanism 3, mounting assembly 30, connecting plate 301, first connecting boss 302, first abutting surface 3021, second abutting surface 3022, first limiting part 3023, connecting assembly 31, rotating housing 311, rotating sleeve 3111, mounting cavity 3112, mounting opening 3113, supporting plate 3114, reinforcing boss 3115, mounting boss 3116, rotating shaft 312, second connecting boss 3121, first end 3122 of the rotating shaft 312, second end 3123 of the rotating shaft 312, elastic ring 313, locking piece 314, limiting ring 315, second limiting part 3151, lower end face 3152, upper end face 3153, second magnetic member 32, second electrical connector 33, first wire 34, first buffer 35, mobile terminal 4, and stylus 5.

DETAILED DESCRIPTION OF EMBODIMENTS

Unless otherwise defined, all technical and scientific terms used herein have the same meaning as commonly understood by those skilled in the art of the disclosure. The terminology used in the specification of the disclosure herein is only for the purpose of describing specific embodiments and is not intended to limit the disclosure. The terms "including" and "having" in the description and claims of the disclosure and the above description of the drawings, as well as any variations thereof, are intended to cover non-exclusive inclusion. The terms "first" and "second" in the description and claims of the disclosure or the above description of the drawings are used to distinguish different objects, not to describe a specific order.

Reference to an "embodiment" herein means that a particular feature, structure or characteristic described in connection with the embodiment can be included in at least one embodiment of the disclosure. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In order to make people in the art better understand the scheme of the disclosure, the technical scheme in the embodiments of the disclosure will be described clearly and completely with the attached drawings.

Referring to FIGS. 1-10, a mobile terminal protective shell is used for installing a mobile terminal 4, and includes a housing body 1, an expansion assembly 2 and a connecting mechanism 3. The connecting mechanism 3 is connected to the housing body 1 and the expansion assembly 2 so that the housing body 1 can rotate relative to the expansion assembly 2. The housing body 1 is used to accommodate the mobile terminal 4. The connecting mechanism 3 includes a mounting assembly 30 and a connecting assembly 31, the mounting assembly 30 is fixedly mounted on the expansion assembly 2, the connecting assembly 31 is rotatably connected to the mounting assembly 30, and the connecting assembly 31 is detachably connected to the housing body 1. The connecting assembly 31 is driven to rotate relative to the mounting assembly 30 to change an angle of the housing body 1 relative to the expansion assembly 2, thereby solving the problem that an angle between the mobile terminal 4 and the expansion assembly 2 cannot be adjusted in the related art, and improving the user experience.

Referring to FIGS. 2-8, the expansion assembly 2 includes an expansion body 20 and a first circuit board 21 used to control the expansion body 20. The housing body 1 includes a mounting housing 10 and a first electrical connector 11 mounted on the mounting housing 10, the mounting housing 10 is used to accommodate the mobile terminal 4, and the first electrical connector 11 can be electrically connected to the mobile terminal 4. The connecting mechanism 3 further includes a second electrical connector 33 installed on the connecting assembly 31, and the second electrical connector 33 is electrically connected to the first circuit board 21 through the first electrical connector 11 on the mounting housing 10. When the connecting assembly 31 is connected to the mounting housing 10, the second electrical connector 33 is electrically connected to the first electrical connector 11. At this time, the mobile terminal 4 is electrically connected to the first circuit board 21 through the first electrical connector 11 and the second electrical component 33. The mobile terminal 4 supplies power to the first circuit board 21 and the extension body 20, and the user can operate the mobile terminal 4 by controlling the extension body 20. When the connecting assembly 31 is separated from the mounting housing 10, the first electrical connector 11 is disconnected from the second electrical connector 33, and the user can use the mounting housing 10 alone to protect the mobile terminal 4.

Figure 6:
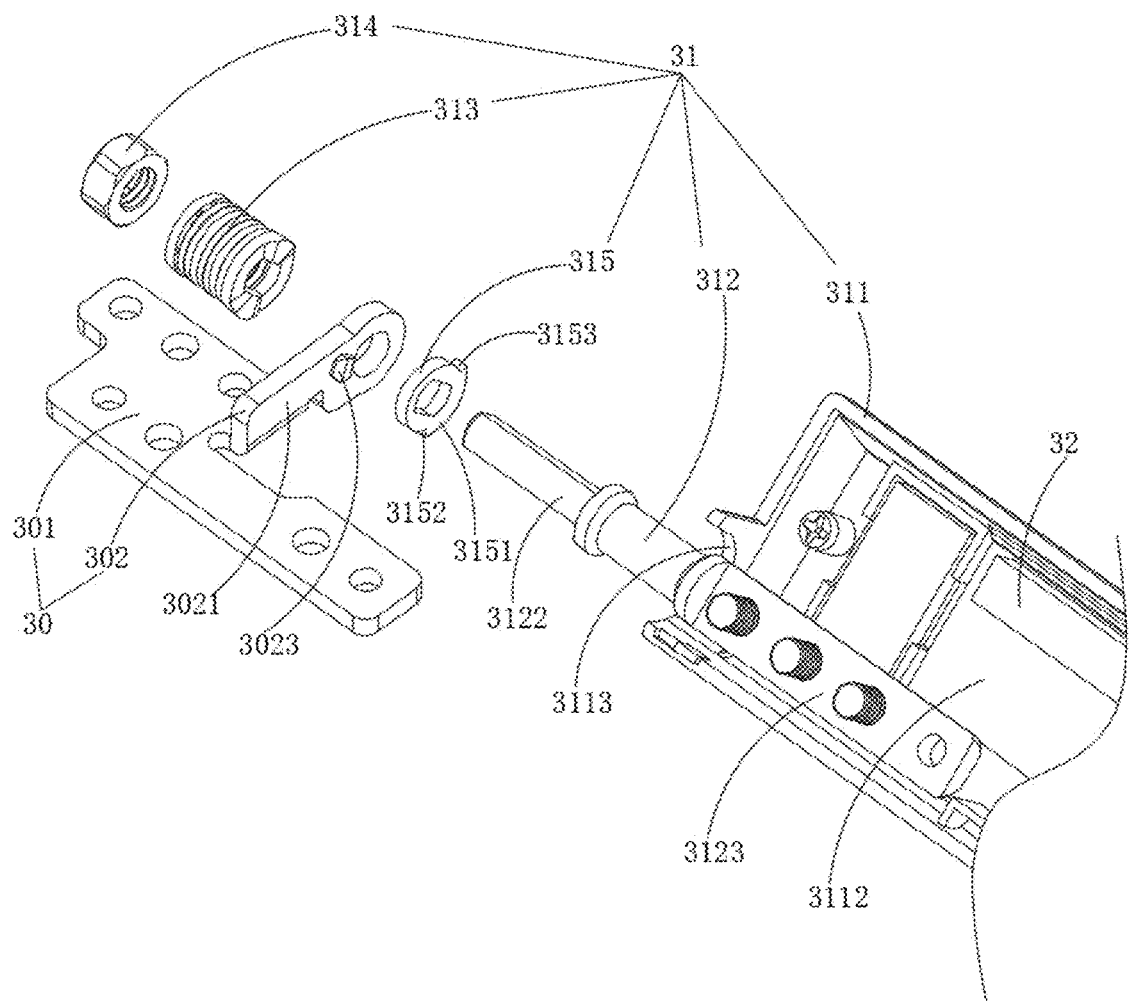
FIG. 6 illustrates a schematic diagram of a connecting mechanism according to the embodiment.

Referring to FIG. 6, the connecting assembly 31 includes a rotating housing 311 and a rotating shaft 312. The rotating housing 311 is detachably connected to the mounting housing 10. A first end 3122 of the rotating shaft 312 is rotatably connected to the mounting assembly 30, and a second end 3123 of the rotating shaft 312 is fixedly connected to the rotating housing 311.

Specifically, the rotating housing 311 and the mounting housing 10 are detachably connected, which is convenient for the user to assemble or disassemble the rotating housing 311 and the mounting housing 10. When the rotating housing 311 and the mounting housing 10 are assembled, the mobile terminal 4 is electrically connected to the extension body 20, and the user can operate the mobile terminal 4 through the extension body 20, thus improving the working efficiency. When the rotating housing 311 and the mounting housing 10 are disassembled, the user can use the mounting housing 10 to protect the mobile terminal 4 alone, which improves the practicability. The first end 3122 of the rotating shaft 312 is rotatably connected to the mounting assembly 30, so that the rotating housing 311 can smoothly rotate relative to the mounting assembly 30, which is convenient for the user to adjust the angle between the mounting housing 10 and the mounting assembly 30, thereby adjusting the angle between the mobile terminal 4 and the extension body 20. The second end 3123 of the rotating shaft 312 is fixedly connected to the rotating housing 311, which ensures the stability of the rotating housing 311 during rotation, effectively prevents the rotating housing 311 from shaking or deviating during rotation, and ensures the stability and reliability of rotation. In this embodiment, the second end 3123 of the rotating shaft 312 is fixedly connected to the rotating housing 311 through screws.

Referring to FIGS. 4-7, the mounting assembly 30 includes a connecting plate 301 and a first connecting boss 302 disposed on the connecting plate 301. The connecting plate 301 is installed in the extension body 20. The first connecting boss 302 includes a first abutting surface 3021 and a second abutting surface 3022 which are opposite to each other. The rotating shaft 312 is provided with a second connecting boss 3121, and the first end 3122 of the rotating shaft 312 passes through the first connecting boss 302, so that the second connecting boss 3121 abuts on the first abutting surface 3021. The connecting assembly 31 further includes a locking piece 314 and an elastic ring 313. The locking piece 314 is installed at the first end 3122 of the rotating shaft 312, the elastic ring 313 is sleeved on the rotating shaft 312, and the elastic ring 313 is connected to the second abutting surface 3022 and the locking piece 314.

Figure 5:
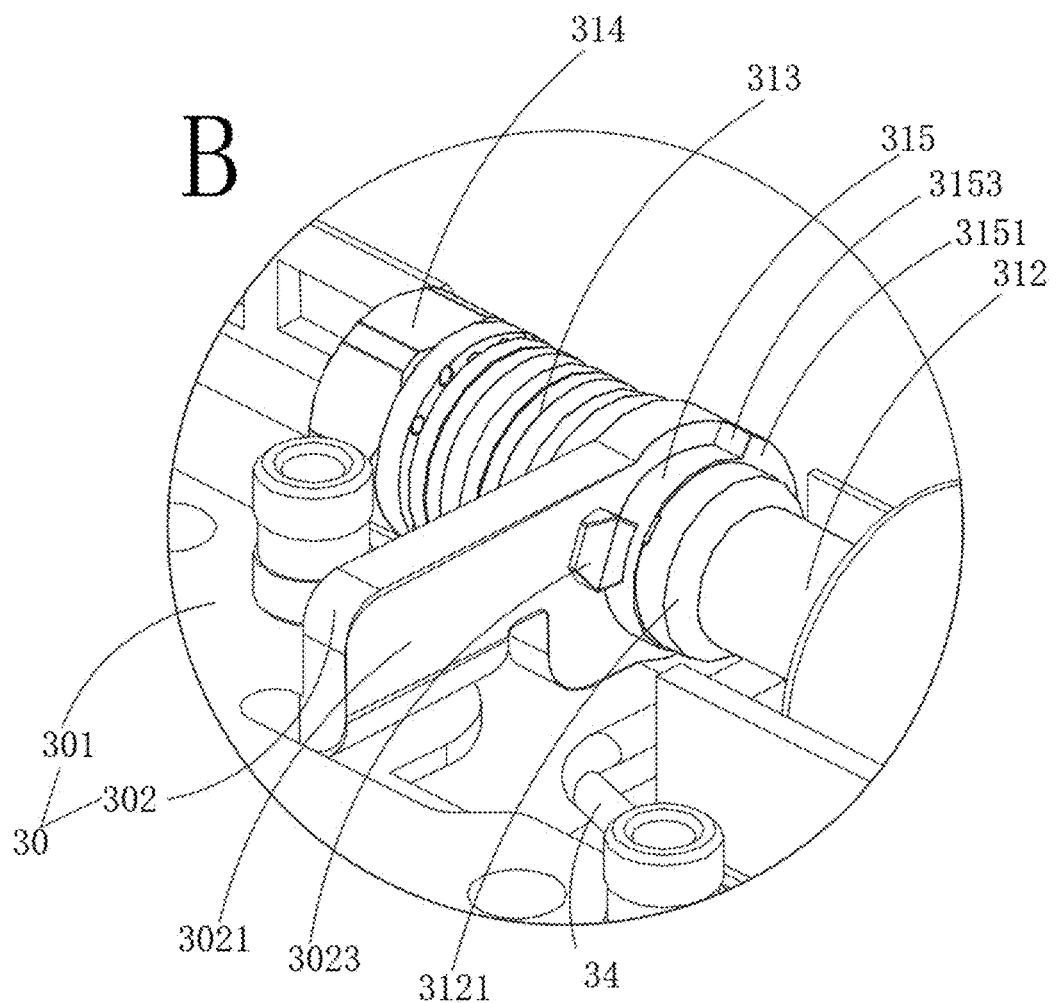
FIG. 5 illustrates an enlarged view of a portion B in FIG. 4.
Figure 7:
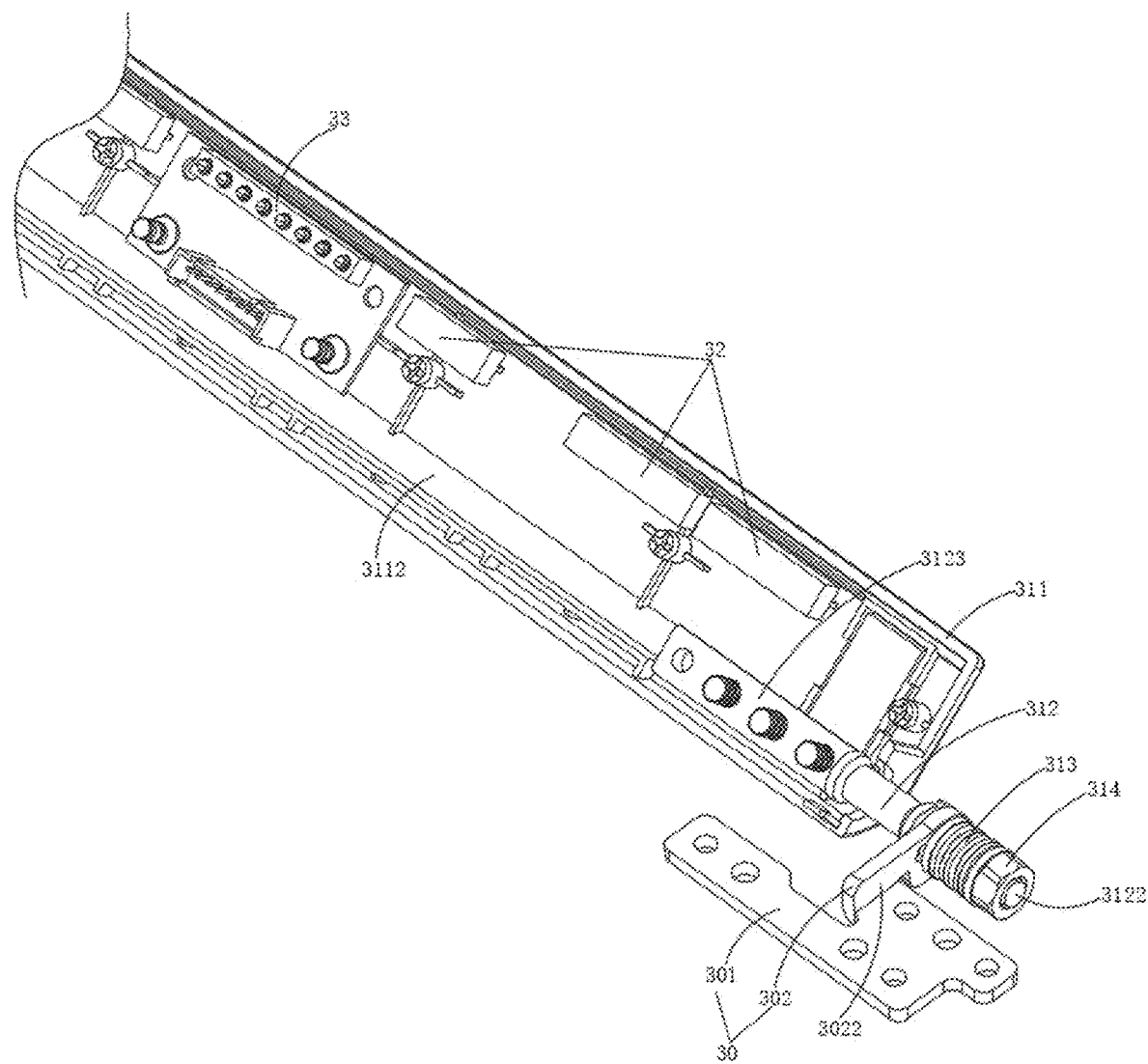
FIG. 7 illustrates another schematic diagram of the connecting mechanism according to the embodiment.

Referring to FIGS. 5-7, the second connecting boss 3121 abuts against the first abutting surface 3021, and the elastic ring 313 abuts against the second abutting surface 3022. The second connecting boss 3121 and the elastic ring 313 increase the friction between the rotating shaft 312 and the first connecting boss 302, and the sum of the friction between the rotating shaft 312 and the first connecting boss 302 is greater than the sum of the gravity of the mounting housing 10 and the mobile terminal 4 accommodated in the mounting housing 10. In this situation, after the user adjusts the angle between the mobile terminal 4 and the extension body 20, the rotating shaft 312 is prevented from rotating due to the weight of the mobile terminal 4 and the mounting housing 10, so that the angle between the mobile terminal 4 and the extension body 20 is fixed and the user experience is improved. Rotating the locking piece 314 can compress or stretch the elastic ring 313, thereby increasing or decreasing the friction between the second abutting surface 3022 and the elastic ring 313, so as to adapt to the weight of different types of mobile terminal 4 and improve the practicability.

Referring to FIG. 5, the first connecting boss 302 is provided with a first limiting part 3023, and the first limiting part 3023 extends along a length direction of the rotating shaft 312. The connecting assembly 31 further includes a limiting ring 315 installed on the rotating shaft 312, and a second limiting part 3151 is provided on the limiting ring 315, and the second limiting part 3151 extends along a circumferential direction of the rotating shaft 312. Rotating the rotating shaft 312 can drive the second limiting part 3151 to abut against the first limiting part 3023. When a lower end face 3152 of the second limiting part 3151 abuts against the first limiting part 3023, the angle between the mobile terminal 4 and the extension body 20 is the largest, that is, the mobile terminal 4 and the extension body 20 are completely opened, so that the user can use the mobile terminal 4 and the extension body 20 at the most reasonable angle. When an upper end face 3153 of the second limiting part 3151 abuts against the first limiting part 3023, the mobile terminal 4 is parallel to and attached to the extension body 20, so as to facilitate the storage and transportation of the mobile terminal 4 and the extension body 20. In this embodiment, the limiting ring 315 is located between the first connecting boss 302 and the second connecting boss 3121, so that the second limiting part 3151 can abut against the first limiting part 3023.

Figure 2:
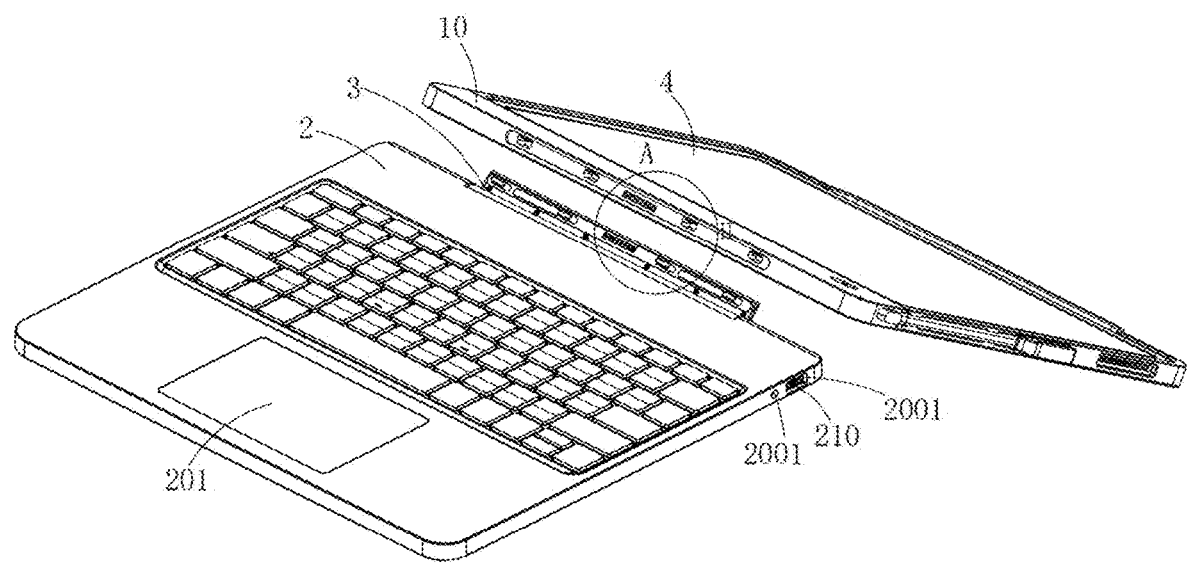
FIG. 2 illustrates another schematic diagram of the mobile terminal protective shell in the use state of the embodiment.
Figure 3:
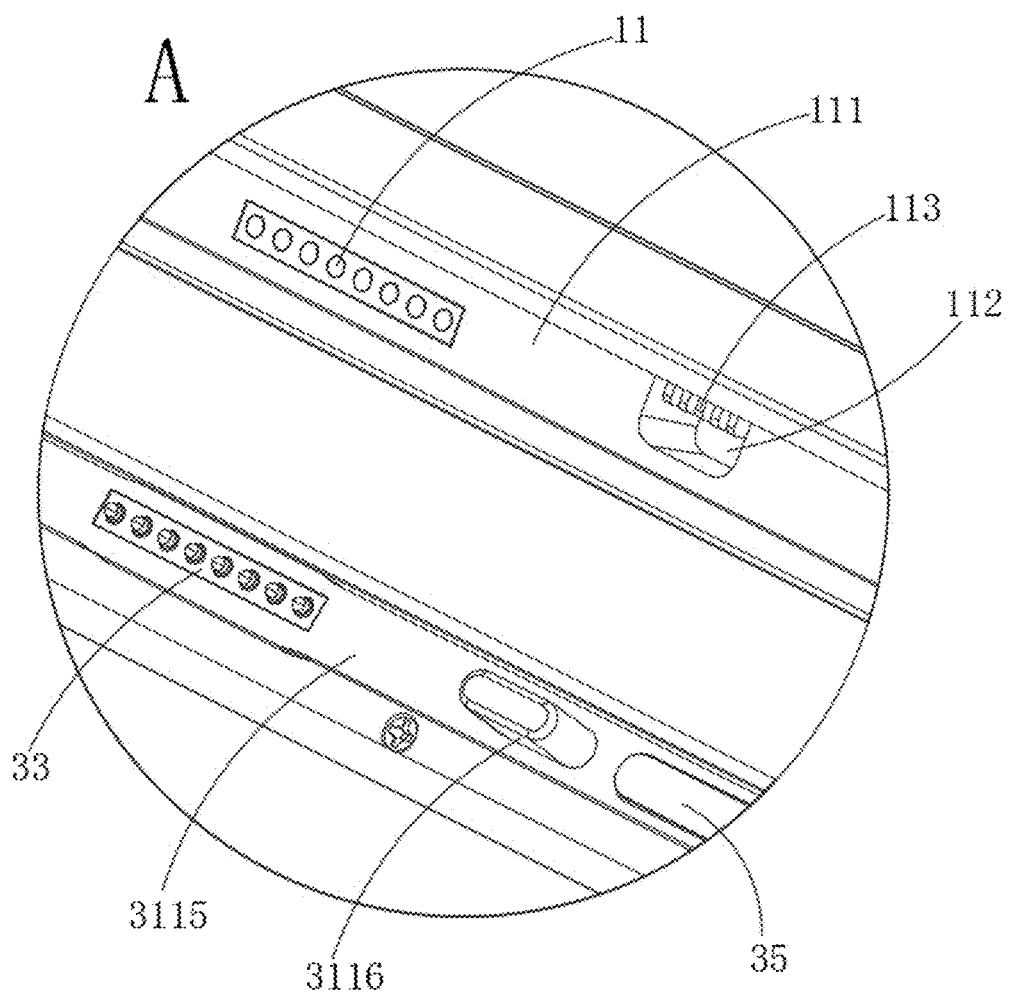
FIG. 3 illustrates an enlarged view of a portion A in FIG. 2.

Referring to FIGS. 2-3, the rotating housing 311 is provided with mounting bosses 3116, and the mounting housing 10 is defined with connecting grooves 112, and the mounting bosses 3116 can be inserted into the connecting grooves 112 respectively.

Specifically, the mounting bosses 3116 are linearly distributed on the rotating housing 311 and the connecting grooves 112 are linearly distributed on the mounting housing 10. By inserting the mounting bosses 3116 into the connecting grooves 112 respectively, the relative displacement between the rotating housing 311 and the mounting housing 10 can be effectively prevented, and the stability when the first electrical connector 11 and the second electrical connector 33 are electrically connected can be ensured. Referring to FIG. 3, in order to further improve the stability of inserting the mounting bosses 3116 into the connecting grooves 112, a groove wall of each connecting groove 112 is provided with an abutting part 113, the abutting part abuts against the mounting boss 3116, so as to make the connection between the mounting boss 3116 and the connecting groove 112 more compact, effectively prevent the problems of loosening and falling off caused by external forces such as vibration and impact, and improve the reliability when the mounting boss 3116 is connected to the connecting groove 112.

Figure 10:
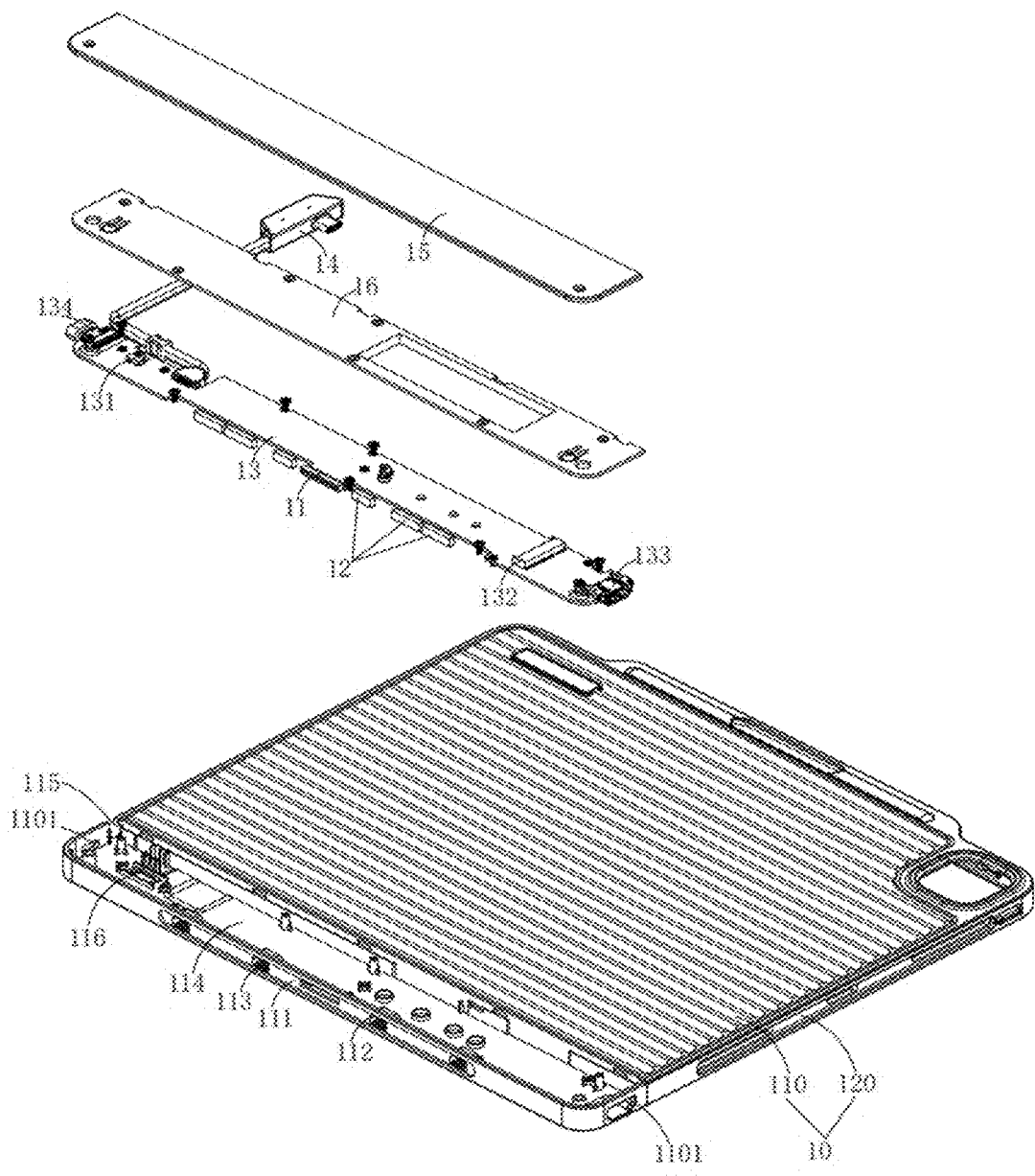
FIG. 10 illustrates another exploded view of the housing body according to the embodiment.

Referring to FIGS. 7 and 10, the housing body 1 further includes first magnetic members 12, and the first magnetic members 12 are distributed at a lower end of the mounting housing 10. The connecting mechanism 3 further includes second magnetic members 32, the second magnetic members 32 are distributed in the rotating housing 311, and the first magnetic members 12 can be magnetically attracted to the second magnetic members 32. Through the magnetic connection between the first magnetic members 12 and the second magnetic members 32, the connection between the mounting housing 10 and the rotating housing 311 is more stable and reliable. When it is necessary to connect the rotating housing 311 and the mounting housing 10, the mounting bosses 3116 are placed close to the connecting grooves 112, and the mounting bosses 3116 automatically insert the connecting grooves 112 under the magnetic force of the first magnetic members 12 and the second magnetic members 32, which makes the connecting process more convenient.

Referring to FIGS. 2-8, the rotating housing 311 includes a rotating sleeve 3111 and a supporting plate 3114 connected to the rotating sleeve 3111. The rotating sleeve 3111 is internally defined with an mounting cavity 3112, and the mounting cavity 3112 extends into the supporting plate 3114. The mounting bosses 3116 are arranged on the supporting plate 3114, and the second magnetic members 32 are arranged in the mounting cavity 3112. The second end 3123 of the rotating shaft 312 extends into the mounting cavity 3112 and is fixedly connected to the rotating sleeve 3111. In this embodiment, the second end 3123 of the rotating shaft 312 is fixedly connected to the rotating sleeve 3111 by screws. The second electrical connector 33 is disposed in the mounting cavity 3112, and penetrates through the supporting plate 3114 and extends to the outside, so as to facilitate the electrical connection between the second electrical connector 33 and the first electrical connector 11.

Figure 12:
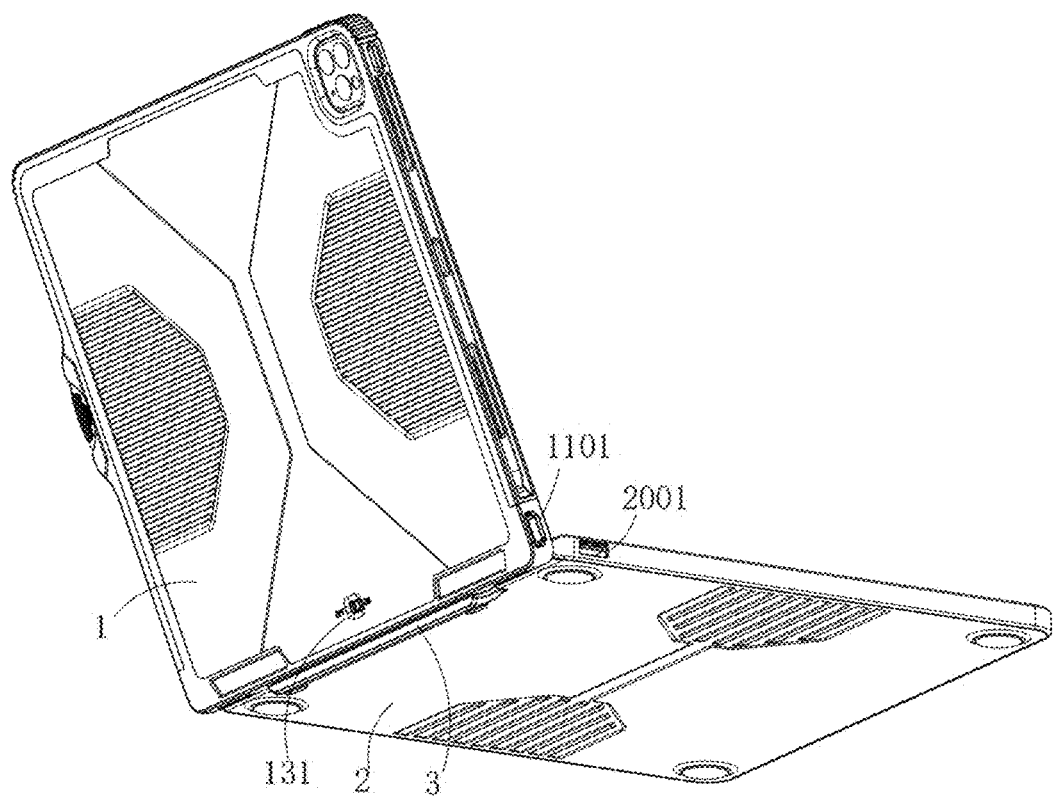
FIG. 12 illustrates a schematic diagram of the mobile terminal protective shell in the use state according to the another embodiment.

Referring to FIG. 7, the mounting cavity 3112 provides a safe installation space for the second electrical connector 33 and the second magnetic members 32, which reduces the damage of the second electrical connector 33 or the second magnetic members 32 caused by accidents or scratches when the rotating shaft 312 rotates, and ensures the service life of the second electrical connector 33 and the second magnetic members 32. Referring to FIG. 12, when the rotating shaft 312 rotates, the joint between the supporting plate 3114 and the rotating sleeve 3111 will abut against the extension body 20, so that there is a maximum rotation angle between the mobile terminal 4 and the extension body 20, and the electrical connection between the second electrical connector 33 and the first circuit board 21 can be prevented from being damaged or broken due to excessive rotation of the supporting plate 3114. The minimum angle between the mobile terminal 4 and the extension body 20 is 0°, the mobile terminal 4 is parallel to the extension body 20 at this time. The maximum angle range between the mobile terminal 4 and the extension body 20 is 1°-270°, and in this embodiment, the maximum angle between the mobile terminal 4 and the extension body 20 is 130°.

Referring to FIGS. 2-3, an outer wall surface of the supporting plate 3114 is provided with a reinforcing boss 3115, the mounting bosses 3116 are arranged on the reinforcing boss 3115, and the mounting bosses 3116 extend along a height direction of the reinforcing boss 3115. The lower end of the mounting housing 10 is defined with a reinforcing groove 111, the connecting grooves 112 are connected to the reinforcing groove 111, and the connecting grooves 112 extend along a depth direction of the reinforcing groove 111. The reinforcing boss 3115 can extend into the reinforcing groove 111, so that the mounting bosses 3116 can be inserted into the connecting grooves 112.

Specifically, the reinforcing boss 3115 increases the strength and rigidity of the mounting bosses 3116, and further enhances the strength of the supporting plate 3114. When the reinforcing boss 3115 extends into the reinforcing groove 111, the reinforcing boss 3115 is inserted into the reinforcing groove 111, and the mounting bosses 3116 are inserted into the connecting grooves 112 respectively, thus forming a more stable connection structure, effectively preventing the crooked deformation of the connecting bosses and the connecting grooves 112 due to uneven stress, and improving the stability of the connection between supporting plate 3114 and mounting housing 10.

Figure 4:
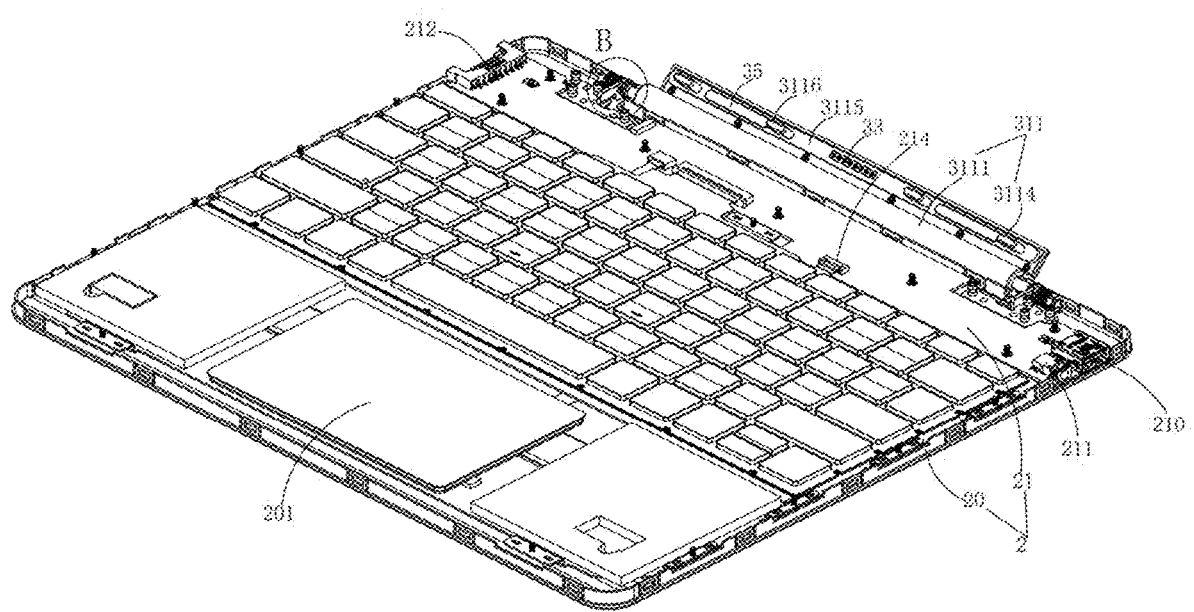
FIG. 4 illustrates a partial schematic diagram of the mobile terminal protective shell according to the embodiment.

Referring to FIGS. 3-4, the connecting mechanism 3 further includes a first buffer 35, the first buffer 35 is installed on the reinforcing boss 3115. The first buffer 35 and the mounting housing 10 play a buffering role in the installation process, which is beneficial to the attraction influence between the mounting housing 10 and the mobile terminal 4 when the first magnetic members 12 and the second magnetic members 32 attract each other, and enhances the stability and service life of the extended body 20 when it is connected to the mounting housing 10 through the connecting assembly 31.

Figure 8:
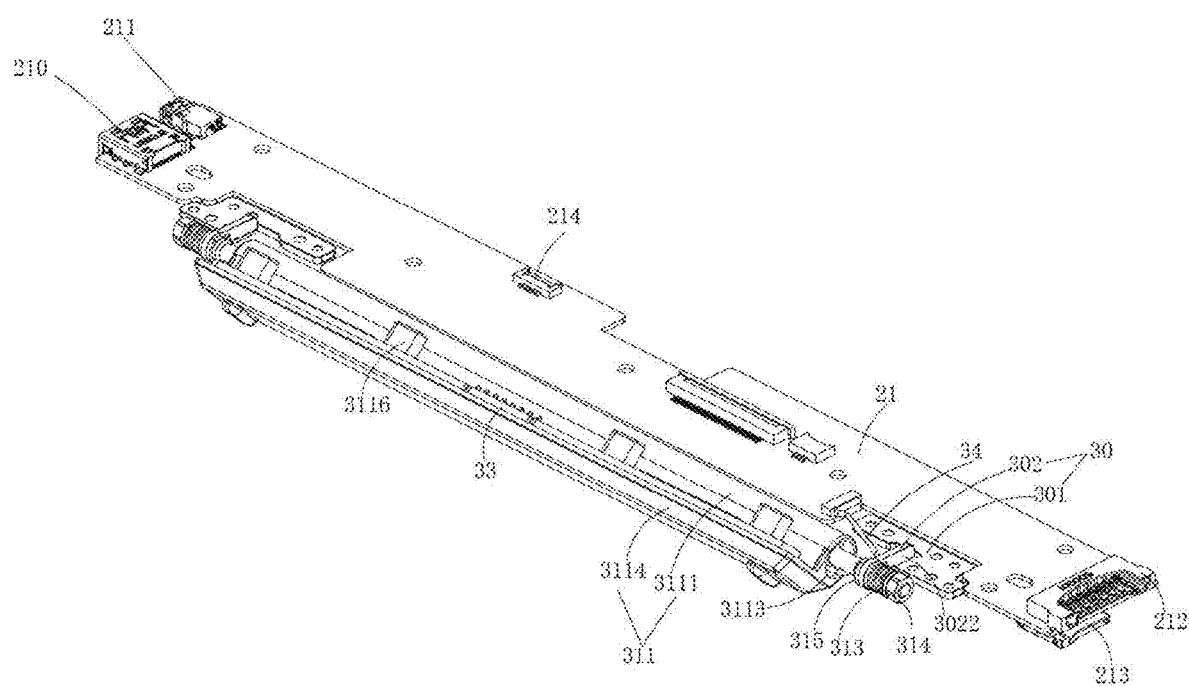
FIG. 8 illustrates another partial schematic diagram of the mobile terminal protective shell according to the embodiment.

Referring to FIGS. 6 and 8, the connecting mechanism 3 further includes a first wire 34, the first wire 34 is a flexible printed circuit (FPC) flat wire and is connected to the second electrical connector 33 and the first circuit board 21. The first wire 34 penetrates through the expansion body 20 and the rotating sleeve 3111, so that the first wire 34 extends into the mounting cavity 3112.

Specifically, the rotating sleeve 3111 is defined with an mounting opening 3113 in the axial direction, and the mounting opening 3113 is connected to the mounting cavity 3112. The rotating shaft 312 is arranged to penetrate through the mounting opening 3113, and the first wire 34 is arranged to penetrate through the mounting opening 3113. The first wire 34 passes through the mounting opening 3113 and enters the mounting cavity 3112 to be electrically connected to the second electrical connector 33, so as to ensure that the rotation of the rotating shaft 312 will not be hindered by the first wire 34, avoid the rotation difficulty or jamming of the rotating shaft 312 caused by the winding or twisting of the first wire 34, and improve the user experience.

Figure 9:
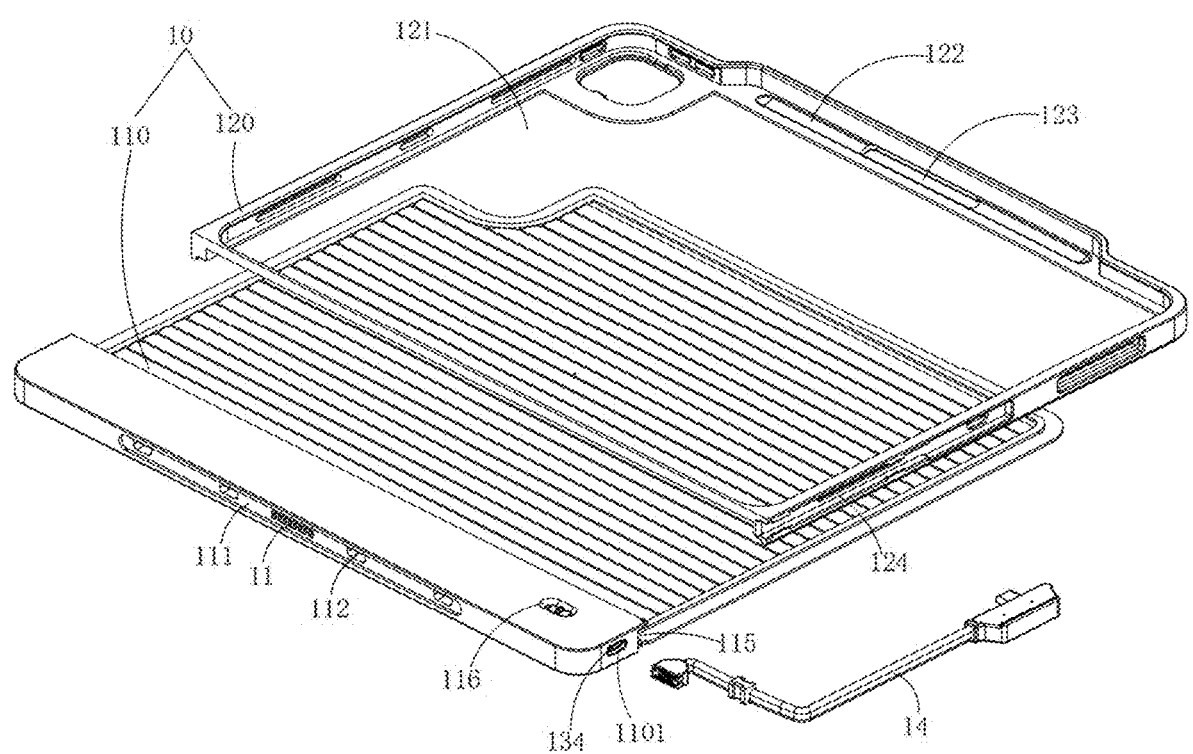
FIG. 9 illustrates an exploded view of the housing body according to the embodiment.

Referring to FIG. 9, the mounting housing 10 is defined with an accommodating cavity 114, and the first electrical connector 11 is installed in the accommodating cavity 114. The first electrical connector 11 penetrates through the mounting housing 10 and extends to the outside, and the first magnetic members 12 are arranged in the accommodating cavity 114.

Specifically, the accommodating cavity 114 provides a safe storage space for the first electrical connector 11 and the first magnetic members 12, and reduces the damage of the first electrical connector 11 or the first magnetic members 12 caused by accidents or scratches.

In an embodiment, the first electrical connector 11 and the second electrical connector 33 are pogo pin connectors. The mobile terminal 4 supplies power to the expansion body 20 through a second wire 14, the first electrical connector 11, and the second electrical connector 33 sequentially. The pogo pin connector has greater compression and more stable contact than a shrapnel connector (also referred to as spring contact connector) with the same size. When the mounting housing 10 and the mobile terminal 4 inside the mounting housing 10 are impacted, the change of the spring pressure of the pogo pin connector is relatively small, thus ensuring the stability of the electrical connection between the first electrical connector 11 and the second electrical connector 33.

Referring to FIG. 8, the first circuit board 21 further includes a USB interface 210, an audio interface 211, an SD card reading interface 212 and a TF card reading interface 213. The USB interface 210, the audio interface 211, the SD card reading interface 212 and the TF card reading interface 213 are respectively arranged on both sides of the first circuit board 21, and positions of the extension body 20 corresponding to the USB interface 210, the audio interface 211, the SD card reading interface 212 and the TF card reading interface 213 are all defined with first insertion holes 2001. The USB interface 210 and the audio interface 211 allow the mobile terminal 4 to be connected to an external audio device, such as a professional audio interface, an external sound card, a microphone, a headphone and the like, thereby transmitting high-quality digital audio signals. The SD card reading interface 212 is used to plug in an SD card, so that the mobile terminal 4 can read data stored in some large mobile devices, such as old-fashioned collectors, digital cameras, digital video cameras and the like. The TF card reading interface 213 is used to plug in a TF card, so that the mobile terminal 4 can read the data stored in some small mobile devices, such as MP3, MP4, tape recorder, radio, etc. The USB interface 210, the audio interface 211, the SD card reading interface 212 and the TF card reading interface 213 each provide different ways of function expansion and data exchange for the mobile terminal 4, so that the user can use the mobile terminal 4 more flexibly to meet the needs in different scenarios.

Referring to FIG. 4, in order to facilitate the user to operate the mobile terminal 4, the extension body 20 further includes a touchpad 201, and the first circuit board 21 further includes a touch interface 214 electrically connected to the touchpad 201. The addition of the touchpad 201 enables the user to perform operations such as cursor movement, clicking, or scrolling without leaving the extension body 20, which greatly improves the convenience and efficiency of operation. The touchpad 201 also supports multi-finger operation, which can improve the precision and accuracy of operation by realizing more precise cursor positioning and gesture recognition.

Referring to FIG. 9, the mounting housing 10 is defined with a placement cavity 121 and a pen slot 122. The placement cavity 121 is connected to the pen slot 122, the placement cavity 121 is used to accommodate the mobile terminal 4, and the pen slot 122 is used to accommodate a stylus 5.

Specifically, the pen slot 122 can fix the stylus 5 on the mounting housing 10, so that the user does not need to carry the stylus 5 alone when carrying the mounting housing 10, thus reducing the risks of loss and damage of the stylus 5. In order to facilitate the user to take the stylus 5, the mounting housing 10 is further defined with a notch 123, and the notch 123 is connected to the pen slot 122, so that the user can detach the stylus 5 from the pen slot 122 through the notch 123, thereby taking the stylus 5 out of the mounting housing 10 for use.

Figure 11:
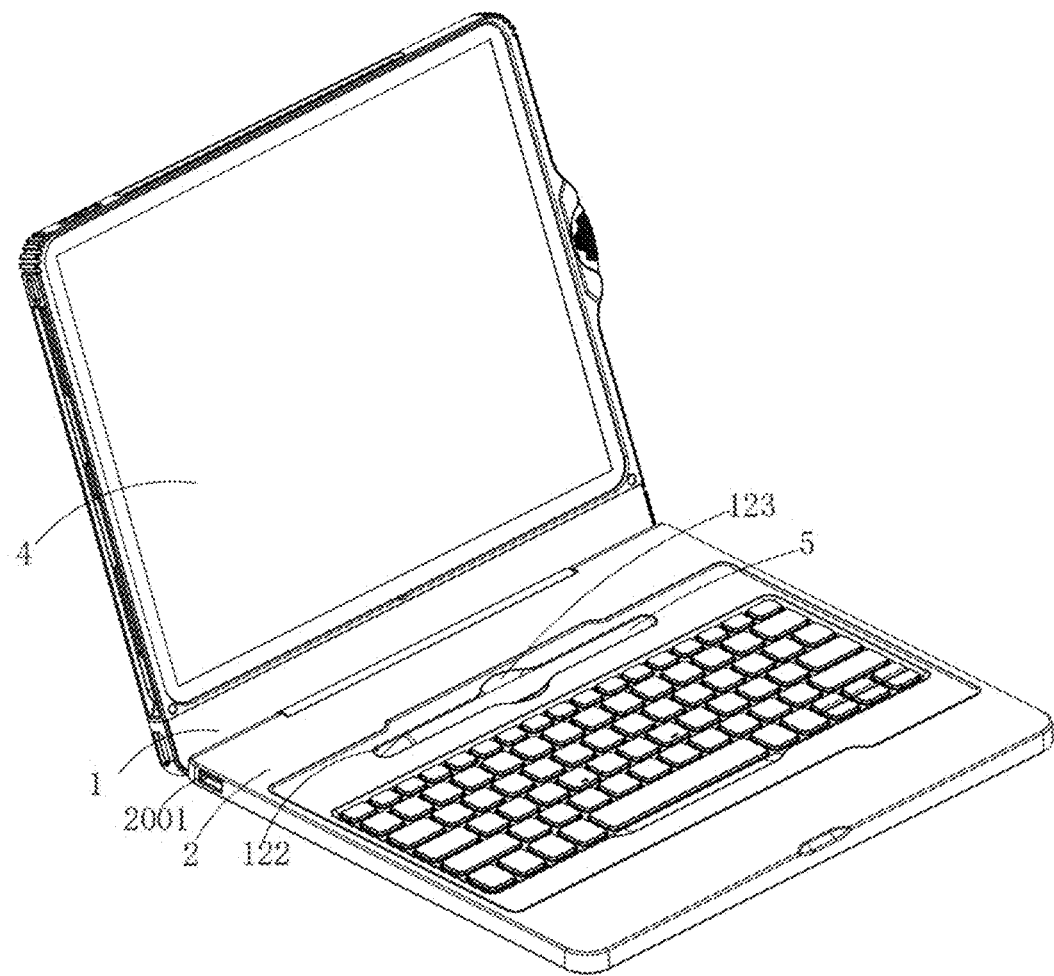
FIG. 11 illustrates a schematic diagram of a mobile terminal protective shell in a use state according to another embodiment.

In an embodiment, referring to FIG. 11, the pen slot 122 can also be formed on the extension body 20, the notch 123 is also formed on the extension body 20, and the notch 123 is connected to the pen slot 122. By arranging the pen slot 122 on the extension body 20, the user can take and use the stylus 5 when using the extension body 20, without interrupting the work, thus improving the use experience of the user.

Referring to FIG. 9, the mounting housing 10 includes a hard mounting plate 110 and a soft protective sleeve 120. The accommodating cavity 114 is formed on the mounting plate 110. The protective sleeve 120 surrounds an end of the mounting plate 110 to form the placement cavity 121, and the pen slot 122 is formed on the protective sleeve 120.

Specifically, the hard mounting plate 110 provides good structural stability and durability, and can effectively prevent the first electrical connector 11 in the accommodating cavity 114 from being impacted and squeezed by the outside. The soft protective cover 120 can adapt to different shapes and sizes of mobile terminal 4, providing better fit and protective effects.

Referring to FIGS. 9-10, the housing body 1 further includes a second circuit board 13 and a second wire 14 electrically connected to the second circuit board 13, the second circuit board 13 is installed in the accommodating cavity 114 and is electrically connected to the first electrical connector 11, and the second wire 14 is electrically connected to the mobile terminal 4.

Specifically, the mounting plate 110 is defined with a wire through hole 115, and the protective sleeve 120 is defined with a wire slot 124. The second wire 14 is an FPC flat wire, and the second wire 14 passes through the wire through hole 115 and is accommodated in the wire slot 124, so as to facilitate the concealed installation of the second wire 14 in the protective sleeve 120. In order to match different types of mobile terminal 4, a lightning interface, a Type-C interface, or an intelligent contact interface can be adopted at the connection between the second wire 14 and the mobile terminal 4, and the position and type of the second wire 14 can be designed according to the corresponding type of mobile terminal 4, for example, when connecting the Apple mobile terminal, the second wire 14 is designed as an intelligent contact interface. In this embodiment, the first electrical connector 11 and the second circuit board 13 are integrally designed, which can save the occupied space of the first electrical connector 11, facilitate the miniaturization of the mounting plate 110, and make the internal parts of the accommodating cavity 114 more compact.

Referring to FIG. 10, the accommodating cavity 114 is defined with an opening on the mounting plate 110, and an opening direction of the accommodating cavity 114 is opposite to that of the placement cavity 121. The second circuit board 13 is provided with a control switch 131, the control switch 131 is used to control on and off of the electrical connection between the mobile terminal 4 and the second circuit board 13 or between the mobile terminal 4 and the first electrical connector 11. The mounting plate 110 is defined with a groove 116 at a position corresponding to the control switch 131, the groove 116 is connected to the accommodating cavity 114, and the control switch 131 is located in the groove 116.

In this embodiment, the opening direction of the groove 116 is the same as the opening direction of the placement cavity 121, that is, the control switch 131 is arranged on the same side as the mobile terminal 4 and the mounting plate 110. The user can touch the control switch 131 while operating the mobile terminal 4. There is no need to additionally find the control switch 131 when adjusting the position or angle of the mobile terminal 4, which is convenient for the user to control the use or closing of the extension body 20.

Referring to FIG. 12, the groove 116 can also be defined on a back of the mounting plate 110, that is, the opening direction of the groove 116 is opposite to the opening direction of the placement cavity 121, that is, the control switch 131 and the mobile terminal 4 are arranged opposite to the mounting plate 110. The control switch 131 on the back of the mounting plate 110 can avoid the risk of damage of the control switch 131 caused by accidental collision or pressure during the use of the mobile terminal 4, and improve the safety of use.

In addition, the mounting housing 10 further includes a cover plate 15 used to cover the opening of the accommodating cavity 114 to protect the second circuit board 13 and the first electrical connector 11.

In an embodiment, the second circuit board 13 includes a hard disk expansion interface 132, an HDMI interface 133 and a Type-C interface 134. The hard disk expansion interface 132 is used to install a solid-state hard disk and expand the storage capacity of the mobile terminal 4. The HDMI interface 133 is used to transmit audio and video signals to connect the mobile terminal 4 to a compatible computer monitor, a projector, a digital TV or a digital audio equipment. The Type-C interface 134 is used to perform charging, data transmission and audio signal transmission. By adding the hard disk expansion interface 132, the HDMI interface 133 and the Type-C interface 134, the overall performance and user experience of the protective shell can be effectively improved. In this embodiment, the HDMI interface 133 and the Type-C interface 134 are respectively arranged on both sides of the second circuit board 13, and the mounting plate 110 is defined with second insertion holes 1101 at positions corresponding to the HDMI interface 133 and the Type-C interface 134. In addition, this setting also enables the housing body 1 to be used independently without the expansion assembly, for example, connecting a hard disk to the hard disk expansion interface 132 and using the housing body 1 as the hard disk of the mobile terminal 4.

The mounting housing 10 further includes a heat dissipation plate 16 used to dissipate heat from the solid-state hard disk, and a heat conduction layer can be attached to the solid-state hard disk. Through the heat conduction between the heat dissipation plate 16 and the heat conduction layer, it is convenient to dissipate the heat from the solid-state hard disk, and the use efficiency of the solid-state hard disk is improved.

Apparently, the embodiments described above are only part of the embodiments of the disclosure, not all of them. The described embodiments of the disclosure are shown in the drawings, but the patent scope of the disclosure is not limited. The disclosure can be embodied in many different forms, rather, these embodiments are provided so that this disclosure will be thoroughly and comprehensively understood. Although the disclosure has been described in detail with reference to the foregoing embodiments, those skilled in the art may still modify the technical solutions described in the foregoing embodiments, or substitute some of the technical features with equivalents. All equivalent structures made by using the contents of the specification and drawings of the disclosure are directly or indirectly applied to other related technical fields, which are equally within the scope of patent protection of the disclosure.

What is claimed is:

1. A mobile terminal protective shell, configured to install a mobile terminal, comprising: a housing body, an expansion assembly and a connecting mechanism; wherein the connecting mechanism is connected to the housing body and the expansion assembly to make the housing body be capable of rotating relative to the expansion assembly;

wherein the housing body is configured to detachably accommodate the mobile terminal;

wherein the connecting mechanism comprises a mounting assembly and a connecting assembly, the mounting assembly is fixedly installed on the expansion assembly, the connecting assembly is rotatably connected to the mounting assembly, and the connecting assembly is detachably connected to the housing body; and wherein the connecting assembly is driven to rotate relative to the mounting assembly to change an angle of the housing body relative to the expansion assembly;

wherein the housing body comprises a mounting housing and a first electrical connector mounted in the mounting housing; the mounting housing defines a placement cavity; the mobile terminal is detachably accommodated in the placement cavity; when the mobile terminal is accommodated in the placement cavity, the mobile terminal is electrically connected to the first electrical connector to be further connected to the expansion assembly.

2. A mobile terminal protective shell, configured to install a mobile terminal, comprising: a housing body, an expansion assembly and a connecting mechanism; wherein the connecting mechanism is connected to the housing body and the expansion assembly to make the housing body be capable of rotating relative to the expansion assembly;

wherein the housing body is configured to accommodate the mobile terminal;

wherein the connecting mechanism comprises a mounting assembly and a connecting assembly, the mounting assembly is fixedly installed on the expansion assembly, the connecting assembly is rotatably connected to the mounting assembly, and the connecting assembly is detachably connected to the housing body; and wherein the connecting assembly is driven to rotate relative to the mounting assembly to change an angle of the housing body relative to the expansion assembly:

wherein the expansion assembly comprises an expansion body and a first circuit board configured to control the expansion body;

the housing body comprises a mounting housing and a first electrical connector mounted on the mounting housing, the mounting housing is configured to accommodating the mobile terminal, and the first electrical connector is capable of being electrically connected to the mobile terminal;

the connecting mechanism further comprises a second electrical connector, and the second electrical connector is installed on the connecting assembly and electrically connected to the first circuit board; and when the connecting assembly is connected to the mounting housing, the second electrical connector is electrically connected to the first electrical connector; when the connecting assembly is separated from the mounting housing, the first electrical connector is disconnected from the second electrical connector.

3. The mobile terminal protective shell as claimed in claim 2, wherein the connecting assembly comprises a rotating housing and a rotating shaft;

the rotating housing is detachably connected to the mounting housing; and a first end of the rotating shaft is rotatably connected to the mounting assembly, and a second end of the rotating shaft is fixedly connected to the rotating housing.

4. The mobile terminal protective shell as claimed in claim 3, wherein the mounting assembly comprises a connecting plate and a first connecting boss arranged on the connecting plate;

the connecting plate is installed in the expansion body;

the first connecting boss comprises a first abutting surface and a second abutting surface opposite to each other, and a second connecting boss is arranged on the rotating shaft, and the first end of the rotating shaft passes through the first connecting boss to make the second connecting boss abut on the first abutting surface; and the connecting assembly further comprises a locking piece and an elastic ring; the locking piece is arranged at the first end of the rotating shaft; the elastic ring is sleeved on the rotating shaft, and the elastic ring is connected to the second abutting surface and the locking piece.

5. The mobile terminal protective shell as claimed in claim 4, wherein the first connecting boss is provided with a first limiting part, and the first limiting part extends along a length direction of the rotating shaft;

the connecting assembly further comprises a limiting ring, the limiting ring is installed on the rotating shaft, and a second limiting part is arranged on the limiting ring, and the second limiting part extends along a circumferential direction of the rotating shaft; and the rotating shaft is capable of being rotated to drive the second limiting part to abut against the first limiting part.

6. The mobile terminal protective shell as claimed in claim 4, wherein the rotating housing is provided with mounting bosses, and the mounting housing is defined with connecting grooves, and the mounting bosses are capable of being inserted into the connecting grooves.

7. The mobile terminal protective shell as claimed in claim 6, wherein the housing body further comprises first magnetic members, and the first magnetic members are distributed at a lower end of the mounting housing;

the connecting mechanism further comprises second magnetic members distributed in the rotating housing, and the first magnetic members are capable of being magnetically attracted with the second magnetic members.

8. The mobile terminal protective shell as claimed in claim 7, wherein the rotating housing comprises a rotating sleeve and a supporting plate connected to the rotating sleeve, a mounting cavity is defined in the rotating sleeve, the mounting cavity extends into the supporting plate, the mounting bosses are arranged on the supporting plate, and the second magnetic members are arranged in the mounting cavity;

the second end of that rotating shaft extends into the mounting cavity and is fixedly connected to the rotating sleeve; and the second electrical connector is arranged in the mounting cavity, and the second electrical connector penetrates through the supporting plate and extends to the outside.

9. The mobile terminal protective shell as claimed in claim 8, wherein an outer wall surface of the supporting plate is provided with a reinforcing boss, the mounting bosses are arranged on the reinforcing boss, and the mounting bosses extend along a height direction of the reinforcing boss;

the lower end of the mounting housing is defined with a reinforcing groove, the connecting grooves are connected to the reinforcing groove, and the connecting grooves extend along a depth direction of the reinforcing groove; and the reinforcing boss is capable of extending into the reinforcing groove to make the mounting bosses be capable of being inserted into the connecting grooves.

10. The mobile terminal protective shell as claimed in claim 9, wherein the connecting mechanism further comprises a first buffer, the first buffer is installed on the reinforcing boss, and the first buffer is configured to abut against the mounting housing.

11. The mobile terminal protective shell as claimed in claim 8, wherein the connecting mechanism further comprises a first wire, the first wire is connected to the second electrical connector and the first circuit board, and the first wire is arranged to penetrate through the expansion body and the rotating sleeve to make the first wire extend into the mounting cavity.

12. The mobile terminal protective shell as claimed in claim 11, wherein the rotating sleeve is defined with a mounting opening in the axial direction, the mounting opening is connected to the mounting cavity, the rotating shaft is arranged to penetrate through the mounting opening, and the first wire is arranged to penetrate through the mounting opening.

13. The mobile terminal protective shell as claimed in claim 7, wherein the mounting housing is defined with an accommodating cavity, the first electrical connector is installed in the accommodating cavity, the first electrical connector penetrates through the mounting housing and extends to the outside, and the first magnetic members are arranged in the accommodating cavity.

14. The mobile terminal protective shell as claimed in claim 13, wherein the first electrical connector and the second electrical connector are pogo pin connectors.

15. The mobile terminal protective shell as claimed in claim 13, wherein the mounting housing is defined with a placement cavity and a pen slot, the placement cavity is connected to the pen slot, the placement cavity is configured to accommodate the mobile terminal, and the pen slot is configured to accommodate a stylus.

16. The mobile terminal protective shell as claimed in claim 15, wherein the mounting housing comprises a mounting plate and a protective sleeve;

the accommodating cavity is defined on the mounting plate; and the protective sleeve surrounds an end of the mounting plate to define the placement cavity, and the pen slot is defined on the protective sleeve.

17. The mobile terminal protective shell as claimed in claim 15, wherein the housing body further comprises a second circuit board and a second wire electrically connected to the second circuit board, the second circuit board is installed in the accommodating cavity, the second circuit board is electrically connected to the first electrical connector, the first electrical connector is integrally arranged on the second circuit board, and the second wire is configured to electrically connect to the mobile terminal.

18. The mobile terminal protective shell as claimed in claim 17, wherein the accommodating cavity is defined with an opening on the mounting plate, and an opening direction of the accommodating cavity is opposite to that of the placement cavity;

the second circuit board is provided with a control switch, and the control switch is configured to control on and off of an electrical connection between the second circuit board and the mobile terminal; and the mounting plate is defined with a groove corresponding to a position of the control switch, and the groove is connected to the accommodating cavity, and the control switch is located in the groove.

19. The mobile terminal protective shell as claimed in claim 17, wherein the second circuit board comprises a hard disk expansion interface, a high definition multimedia interface (HDMI) and a Type-C interface; the hard disk expansion interface is configured to install a solid-state hard disk, the HDMI is configured to transmit audio and video signals, the Type-C interface is configured to perform charging, data transmission and audio signal transmission, and the mounting housing is defined with second insertion holes at positions corresponding to the HDMI and the Type-C interface.

20. The mobile terminal protective shell as claimed in claim 2, wherein the first circuit board further comprises a universal serial bus (USB) interface, an audio interface, a secure digital (SD) card reading interface and a TransFlash (TF) card reading interface; the USB interface, the audio interface, the SD card reading interface, and the TF card reading interface are respectively located on two sides of the first circuit board, and the extension body is defined with first insertion holes at positions corresponding to the USB interface, the audio interface, the SD card reading interface and the TF card reading interface.

* * * * *